(No Model.)
J. M. HARNEY.
Caloric Safe for Cooking Vessels.
No. 238,682.          Patented March 8, 1881.
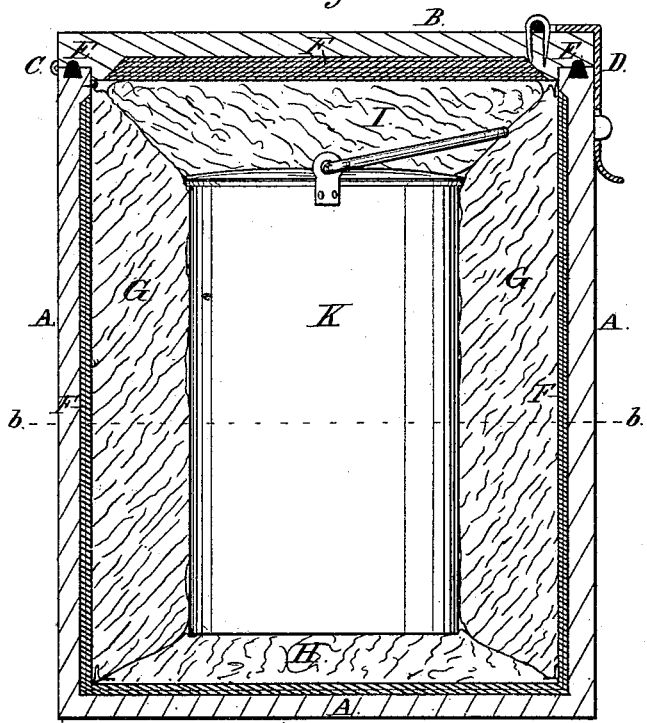
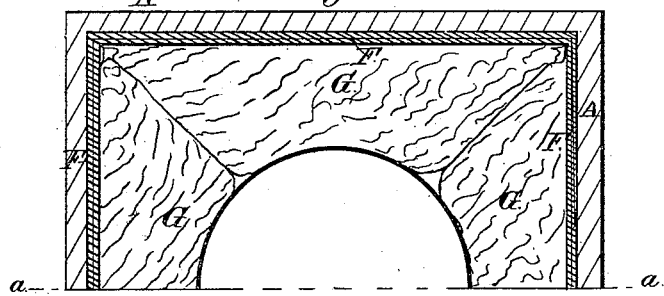
Witnesses:
Geo. H. Knight.
Walter Allen
Inventor:
John M. Harney
By Knight Bros.
Attys.

UNITED STATES PATENT OFFICE.

JOHN M. HARNEY, OF ST. LOUIS, MISSOURI.

CALORIC SAFE FOR COOKING-VESSELS.

SPECIFICATION forming part of Letters Patent No. 238,682, dated March 8, 1881.

Application filed April 12, 1880. (No model.)

*To all whom it may concern:*

Be it known that I, JOHN M. HARNEY, a citizen of the United States, residing at the city of St. Louis, in the State of Missouri, have invented Improvements in Muffs or Caloric Safes for Cooking-Vessels, of which the following is a specification.

My invention relates to those useful means of cooking whereby the cooking stove or range can be relieved of a considerable number of vessels or kettles and the cooking proceed after said vessels are removed from the said stove or range.

My improvement consists, secondly, in combining with a cooking-vessel a muff consisting of an outer case or box of any suitable form, made to close tightly, and lined with a stratum of paper or felt, and an inner packing of feathers, suitably inclosed, forming cushions for muffling the boilers. This muff or caloric safe keeps the temperature of the water or liquid at a sufficient height to cook the contents of the vessel.

In the drawings I have shown a rectangular box, supposed to be made of wood.

Figure 1 is a section at *a a* of Fig. 2, showing the inclosed vessel in elevation. Fig 2 is a section at *b b* of Fig. 1.

A is the case. This is shown as made of wood, with a wooden lid, B, tightly fitted to its top, and connected by hinges C at one edge.

D is a hasp or catch holding the lid firmly down on the box.

E is a rib of rubber let into the top of the box, as shown, extending all around, so as to hermetically close the joint between the lid and the box. The sealing rib or ring E may be inserted in the lid instead of the box, and bear upon the latter.

The walls and lid of the box are covered upon the inside with a packing or lining, F, of paper or felt-paper, or asbestus, so as to prevent the passage of air inward or outward, and also to act as a non-conductor of heat. The inside of the box is covered at the sides and bottom with feather-stuffed cushions, the side cushions being shown at G and the bottom cushion at H. I is a detached cushion stuffed with feathers, like the others, G H, and made to fit snugly over the vessel K, and to fit tightly against the upper edges of the side cushions, G, so as to prevent the convective escape of heat. The cushions may be made from four to twelve inches in thickness from the sides of the case inward.

In using the apparatus, the vessel K, containing water or other liquid at a boiling temperature and the article to be cooked, is placed in the position shown and covered with the cushion I. The lid B is then closed, and the liquid in the vessel K will be found to remain at a nearly equal temperature for hours, so that the process of cooking will continue without any addition of heat.

There are many uses to which my apparatus may be applied besides that of cooking food. For instance, it can be used to retain articles in a heated condition for many hours.

Having thus described my invention, the following is what I claim as new therein and desire to secure by Letters Patent:

1. The muff herein described, consisting of a box or casing, A B, a non-conducting packing or lining, F, and feather-stuffed cushions G H, removable cushion I, in combination with a cooking-vessel, K, fitting snugly therein, so as to be muffled by the cushions, as set forth.

2. A muff for cooking-vessels constructed with the casing A B, paper lining F, and interior feather-packed cushions, G H I, adapted to snugly fit and press at all sides upon the removable cooking-vessel K, as and for the purpose set forth.

3. The air-tight muff for cooking-vessels, consisting of wooden case A and lid B, india-rubber gasket E in the upper edge of the former, paper lining F, and feather cushions G H I, adapted to press closely against the cooking-vessel, substantially as and for the purpose set forth.

JOHN M. HARNEY.

Witnesses:
SAML. KNIGHT,
GEO. H. KNIGHT.